United States Patent
Arikawa (10) Patent No.: US 7,423,845 B2
(45) Date of Patent: Sep. 9, 2008

(54) RECORDING DISK DRIVE WITH ENHANCED SWINGING MEMBER

(75) Inventor: Yoshihiro Arikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 307 days.

(21) Appl. No.: 11/190,775

(22) Filed: Jul. 27, 2005

(65) Prior Publication Data
US 2006/0215329 A1 Sep. 28, 2006

(30) Foreign Application Priority Data
Mar. 24, 2005 (JP) ............................. 2005-087331

(51) Int. Cl.
G11B 5/54 (2006.01)
G11B 21/22 (2006.01)

(52) U.S. Cl. .................................. 360/256.4

(58) Field of Classification Search .... 360/256.1–256.6
See application file for complete search history.

(56) References Cited

U.S. PATENT DOCUMENTS

| | | | | |
|---|---|---|---|---|
| 5,455,728 A * | 10/1995 | Edwards et al. | ........... | 360/256.2 |
| 5,528,437 A * | 6/1996 | Mastache | ................. | 360/256.4 |
| 5,870,256 A * | 2/1999 | Khanna et al. | ............ | 360/256.4 |
| 6,163,440 A * | 12/2000 | Takahashi et al. | ......... | 360/256.4 |
| 6,185,074 B1 * | 2/2001 | Wang et al. | ............... | 360/256.4 |
| 6,507,461 B1 * | 1/2003 | Kimura et al. | ........... | 360/256.4 |
| 6,574,073 B1 * | 6/2003 | Hauert et al. | ................ | 360/137 |
| 6,680,822 B1 * | 1/2004 | Lin et al. | .................. | 360/256.4 |
| 6,731,468 B2 | 5/2004 | Williams et al. | ......... | 360/256.4 |
| 6,801,403 B2 * | 10/2004 | Miyajima | ................. | 360/256.4 |
| 7,379,272 B2 * | 5/2008 | Kato et al. | ................ | 360/256.4 |
| 2002/0149882 A1 | 10/2002 | Williams et al. | ............ | 360/256 |
| 2005/0180055 A1 * | 8/2005 | Kim et al. | ................. | 360/256.4 |
| 2006/0215328 A1 * | 9/2006 | Kato et al. | ................ | 360/256.4 |

FOREIGN PATENT DOCUMENTS

| | | | |
|---|---|---|---|
| JP | 2000251424 A | * | 9/2000 |
| JP | 2002-63772 | | 2/2002 |
| JP | 2002-319259 | | 10/2002 |

* cited by examiner

Primary Examiner—Brian E Miller
(74) Attorney, Agent, or Firm—Greer, Burns & Crain, Ltd.

(57) ABSTRACT

A disk drive includes a latch mechanism. A lever and a weight are supported on a first shaft. The lever defines first and second operating spots distanced from the first shaft by first and second distances, respectively. The weight is distanced from the first shaft by a third distance shorter than the first and second distances. A swinging member is supported on a second shaft at a position defined between the first and second operating spots within a space between the lever and the cover of the enclosure. Even if impact acts on the disk drive, the lever is received on the swinging member between the first and second operating spots. The lever is prevented from moving in the axial direction of the first shaft. Contact is reliably prevented between the lever and the cover. Generation of noise can thus be avoided.

5 Claims, 5 Drawing Sheets

RECORDING DISK DRIVE WITH ENHANCED SWINGING MEMBER

BACKGROUND OF THE INVENTION

1. Field of the Invention

The present invention relates to a disk drive such as a hard disk drive (HDD). In particular, the invention relates to a recording disk drive comprising a recording disk and a ramp member located at a location outside the recording disk.

2. Description of the Prior Art

A head actuator is incorporated in a hard disk drive, HDD, for example. The head actuator includes a head actuator member swinging around a support shaft so as to follow a predetermined path. The support shaft is fixed to the base with a screw. The support shaft is likewise coupled to the cover with a screw. A ramp member is disposed at a position outside the magnetic recording disk on the predetermined path of the head actuator member. When the magnetic recording disk stands still, the tip end of the head actuator member is received on the ramp member. A head slider is supported on the tip end of the head actuator member.

A latch mechanism is also incorporated in the hard disk drive. The latch mechanism includes a lever supported on a first shaft for swinging movement. A weight is connected to the lever. The weight is thus supported on the first shaft for swinging movement. A swinging member is related to the lever. The swinging member is supported on a second shaft for swinging movement. The swinging member is designed to contact first or second operating spot defined at the tip end of the lever. The swinging movement of the lever around the first shaft causes the swinging movement of the swinging member around the second shaft.

When the magnetic recording disk stands still, impact acting on the enclosure of the hard disk drive induces inertial force driving the head actuator member around the support shaft. The weight is also forced to move around the first shaft based on inertial force. The lever thus swings. The swinging movement of the lever causes the swinging member to get into the predetermined path of the head actuator member. The swinging member thus serves to restrict the swinging movement of the head actuator member. Contact can be avoided between the head slider and the surface of the magnetic recording disk.

The lever is located at a position between the first and second operating spots within a space between the swinging member and the cover in the hard disk drive. The first and second operating spots are distanced from the first shaft by first and second distances, respectively. The weight is distanced from the first shaft by a third distance shorter than the first and second distances. A larger displacement can thus be obtained at the tip end of the lever. When impact is applied to the enclosure of the hard disk drive, the tip end of the lever is supposed to move in parallel with the axis of the first shaft by a larger amount. The lever thus collides against the cover. The contact causes noise.

In this case, if the lever successively collides against the cover, the cover suffers from not only noise but also vibration. Since the cover is coupled to the support shaft with a screw, the vibration of the cover is transmitted to the head actuator member through the screw. The vibration of the head actuator member leads to a deteriorated accuracy in positioning the head slider relative to the magnetic recording disk. The head slider sometimes fails to read or write information with a higher accuracy.

In addition, the lever and the first shaft are supposed to wear out due to the contact between the lever and the cover. Dust is thus generated based on the wear. The generated dust brings disadvantages to the flight of the head slider.

SUMMARY OF THE INVENTION

It is accordingly an object of the present invention to provide a recording disk drive capable of avoiding contact between the lever and the cover, resulting in a reliable operation of the recording disk drive.

According to the present invention, there is provided a recording disk drive comprising: a head actuator member supporting a head slider, said head actuator member following a predetermined path when released from a ramp member based on swinging movement around a support shaft; a lever supported on a first shaft for swinging movement, said lever defining first and second operating spots distanced from the first shaft by first and second distances, respectively; a weight supported on the first shaft for connection to the lever, said weight distanced from the first shaft by a third distance shorter than the first and second distances; and a swinging member supported on a second shaft for swinging movement, said swinging member located at a position defined between the first and second operating spots within a space between the lever and a cover. In this case, the swinging member comprises: a first swinging piece designed to contact the first operating spot of the lever swinging in a first direction so that the first swinging piece swings around the second shaft into the predetermined path of the head actuator member; and a second swinging piece designed to contact the second operating spot of the lever swinging in a second direction opposite to the first direction so that the second swinging piece allows the first swinging piece to swing around the second shaft into the predetermined path of the head actuator member.

When impact acts on the recording disk drive around the support shaft of the head actuator member during the still state of the recording disk, the head actuator member swings around the support shaft along the predetermined path in response to inertial force. The lever simultaneously swings around the first shaft based on inertial force. The lever is contacted with the first or second swinging piece at the first or second operating spot. The first swinging piece is in this manner allowed to get into the predetermined path of the head actuator member. The swinging movement of the head actuator arm is thus restrained. Contact can be prevented between the head slider and the surface of the recording disk. The head slider is reliably prevented from damages.

In addition, the swinging member is located at a position between the first and second operating spots in a space between the lever and the cover. Even if impact acts on the recording disk drive, the lever is received on the swinging member between the first and second operating spots. The lever is prevented from moving in the axial direction of the first shaft. Contact is reliably prevented between the lever and the cover while the tip end of the lever is allowed to move by a larger displacement because of the weight farther from the first shaft than the first and second operating spots. Generation of noise can thus be avoided. The head actuator member is reliably prevented from suffering from vibration. The head slider contributes to an improved accuracy in the read and write operation.

The recording disk drive of the type may further comprise: a voice coil motor designed to drive the head actuator member for the swinging movement; and a magnetic piece located on the second swinging piece, said magnetic piece drawn to a magnetic field acting from the voice coil motor. The swinging member is drawn to the voice coil motor based on the attraction acting on the magnetic piece from the voice coil motor.

The swinging member is prevented from moving in the axial direction of the second shaft. Since the swinging member is designed to receive the lever between the first and second operating spots in the aforementioned manner, the lever is reliably prevented from moving in the axial direction of the first shaft.

The recording disk drive may further comprise a restriction mechanism designed to restrict the movement of the swinging member along the axial direction of the second shaft. The restriction mechanism enables restriction to the movement of the swinging member in the axial direction of the second shaft. Since the swinging member is designed to receive the lever between the first and second operating spots, the lever is reliably prevented from moving in the axial direction of the first shaft.

The recording disk drive may further comprise: a protrusion protruding from the inside surface of a shaft bore formed in the swinging member so as to receive the second shaft; and an elongated groove extending on the outer surface of the second shaft around the longitudinal axis of the second shaft, said elongated groove designed to receive the protrusion. The recording disk drive allows the elongated groove of the second shaft to receive the protrusion on the swinging member. The combination of the protrusion and the elongated groove enables the swinging movement of the swinging member around the second shaft. Since the elongated groove extends along an imaginary plane perpendicular to the second shaft, the protrusion received in the elongated groove serves to restrict the movement of the swinging member in the axial direction of the second shaft along the second shaft. Since the swinging member is designed to receive the lever between the first and second operating spots, the lever is reliably prevented from moving in the axial direction of the first shaft. Contact is reliably prevented between the lever and the cover.

The recording disk drive may further comprise a protrusion protruding from the outer surface of the second shaft, said protrusion designed to hold the swinging member against a base member supporting the second shaft. The protrusion serves to hold the swinging member against the base member. The swinging member is thus prevented from moving in the axial direction of the second shaft. Since the swinging member is designed to receive the lever between the first and second operating spots, the lever is reliably prevented from moving in the axial direction of the first shaft. Contact is reliably prevented between the lever and the cover.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
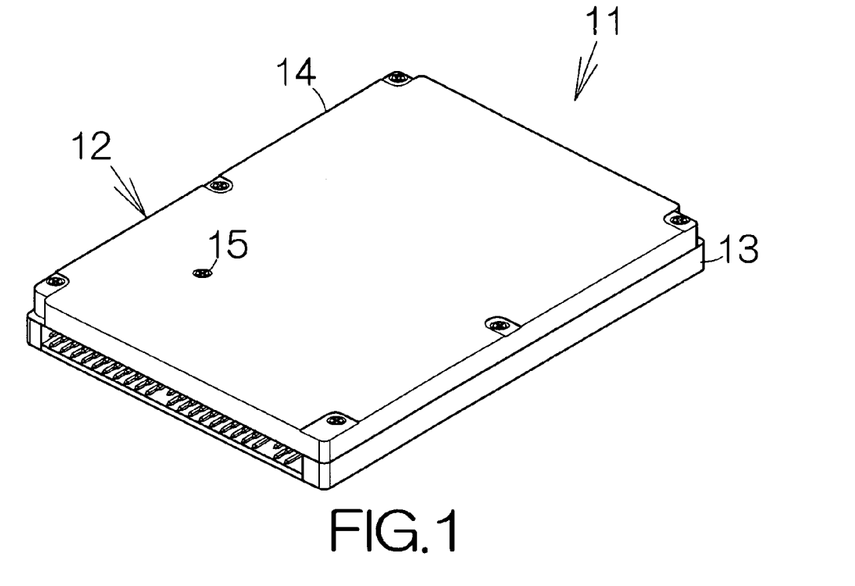
FIG. 1 is a perspective view schematically illustrating the appearance of a hard disk drive, HDD, as an example of a recording disk drive according to the present invention.

FIG. 1 schematically illustrates the appearance of a hard disk drive (HDD) 11 as an example of a recording disk drive or storage device according to an embodiment of the present invention. The HDD 11 includes a box-shaped enclosure 12. The enclosure 12 includes a box-shaped base member or base 13 defining an inner space of a flat parallelepiped, for example. The base 13 may be made of a metallic material such as aluminum, for example. Molding process may be employed to form the base 13.

A cover 14 is coupled to the base 13. The inner space of the base 13 is closed with the cover 14. Pressing process may be utilized to form the cover 14 out of a single plate material. The plate material may be an aluminum plate, for example. The thickness of the plate is set in a range between 0.4 mm and 0.5 mm, for example. The plate material may be a layered material, for example. A screw 15 is screwed into the cover 14. The screw 15 penetrates the cover 14 so as to reach a support shaft of a head actuator as described later in detail.

Figure 2:
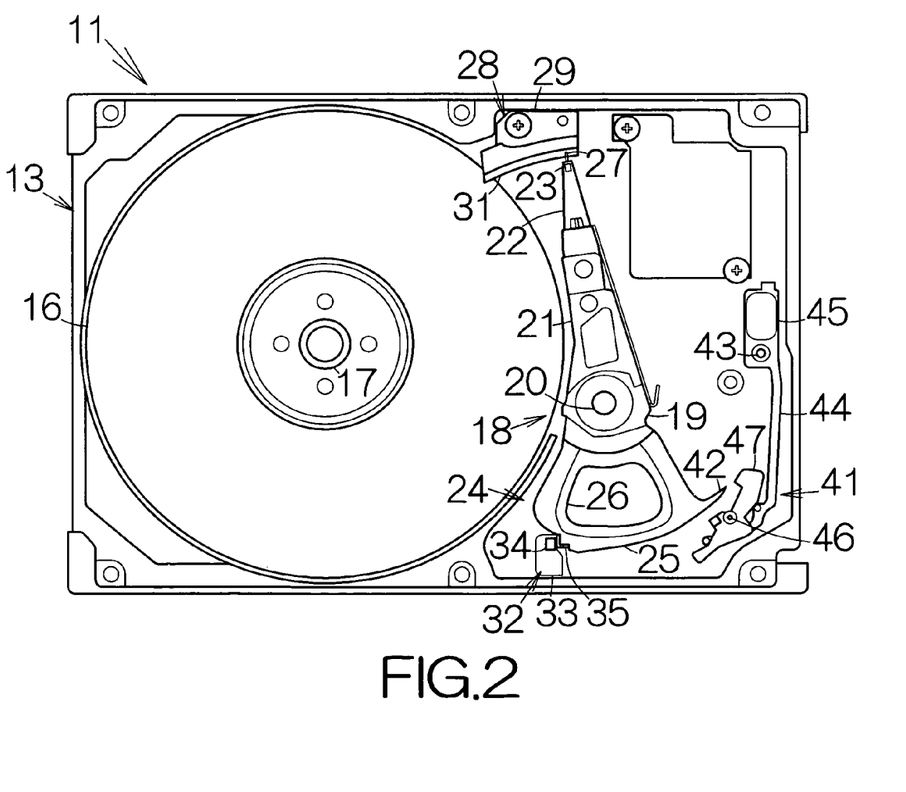
FIG. 2 is a plan view schematically illustrating the inner structure of the hard disk drive.

As shown in FIG. 2, at least one magnetic recording disk 16 is incorporated in the inner space of the base 13. The magnetic recording disk or disks 16 is mounted on the driving shaft of a spindle motor 17. The spindle motor 17 is allowed to drive the magnetic recording disk or disks 16 for rotation at a higher revolution speed such as 5,400 rpm, 7,200 rpm, 10,000 rpm, 15,000 rpm, or the like, for example.

A head actuator 18 is also incorporated in the inner space of the base 13. The head actuator 18 includes an actuator block 19. The actuator block 19 is coupled to a vertical support shaft 20 for relative rotation. A screw, not shown, is utilized to fix the support shaft 20 to the base 13, for example. The support shaft 20 is likewise coupled to the cover 14 with the aforementioned screw 15. Rigid actuator arms 21 are defined in the actuator block 19. The actuator arms 21 are designed to extend in the horizontal direction from the vertical support shaft 20. The actuator block 19 may be made of aluminum. Extrusion molding process may be employed to form the actuator block 19.

Head suspensions 22 are fixed to the corresponding tip ends of the actuator arms 21 so as to further extend in the forward direction from the actuator arms 21. A gimbal spring, not shown, is connected to the tip end of the individual head suspension 22. A flying head slider 23 is fixed on the surface of the gimbal spring. The gimbal spring allows the flying head slider 23 to change its attitude relative to the head suspension 22.

An electromagnetic transducer, not shown, is mounted on the flying head slider 23. The electromagnetic transducer may include a write element and a read element. The write element may include a thin film magnetic head designed to write magnetic bit data into the magnetic recording disk 16 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 16 by utilizing variation in the electric resistance of a spin valve film or a tunnel-junction film, for example.

When the magnetic recording disk 16 rotates, the flying head slider 23 is allowed to receive airflow generated along the rotating magnetic recording disk 16. The airflow serves to generate positive pressure or a lift and negative pressure on the flying head slider 23. The flying head slider 23 is thus allowed to keep flying above the surface of the magnetic recording disk 16 during the rotation of the magnetic recording disk 16 at a higher stability established by the balance between the urging force of the head suspension 22 and the combination of the lift and the negative pressure.

When the actuator arm 21 is driven to swing around the vertical support shaft 20 during the flight of the flying head slider 23, the flying head slider 23 is allowed to move along the radial direction of the magnetic recording disk 16. This radial movement allows the electromagnetic transducer on the flying head slider 23 to cross the data zone between the innermost recording track and the outermost recording track. The flying head slider 23 can thus be positioned right above a target recording track on the magnetic recording disk 16.

A voice coil motor, VCM, 24 is coupled to the actuator block 19. A core member 25 is formed in the actuator block 19 so as to extend in a horizontal direction from the vertical support shaft 20. The core member 25 may be integral to the actuator block 19. A coil 26 of the voice coil motor 24 is wound around the core member 25. The core member 25 is opposed to a permanent magnet, not shown, fixed to the base 13, for example. When magnetic field is generated in the coil 26 in response to the supply of electric current, the actuator block 19 is caused to rotate around the support shaft 20. In other words, the actuator arms 21 are forced to swing around the support shaft 20.

A load member or load tab 27 is attached to the front or tip end of the head suspension 22 so as to further extend in the forward direction from the head suspension 22. The load tab 27 are allowed to move in the radial direction of the magnetic recording disk 16 based on the swinging movement of the actuator arms 21. A ramp member 28 is located outside the magnetic recording disk 16 on the path of movement of the load tabs 27. The load tabs 27 can be received on the ramp member 28.

The ramp member 28 includes an attachment base 29 screwed in the bottom plate of the base 13 at a location outside the magnetic recording disk 16, for example. The attachment base 29 includes ramp bodies 31 extending from the attachment base 29 along horizontal planes toward the vertical support shaft 20 of the head actuator 18. The ramp bodies 31 may be integral to the attachment base 29 based on molding, for example. The tip end of the individual ramp body 31 is opposed to the non-data zone outside the outermost recording track on the magnetic recording disk 16. The combination of the load tab 27 and the ramp member 28 establishes a so-called load/unload mechanism. The ramp member 28 may be made of a hard plastic material, for example.

A retention mechanism 32 is related to the head actuator 18. The retention mechanism 32 includes a permanent magnet 34 held in an attachment member 33, and a metallic piece 35 opposed to the permanent magnet 34. The attachment member 33 is made of an elastic resin material such as rubber, for example. The attachment member 33 is fixed to the bottom plate of the base 13, for example.

The metallic piece 35 is fixed to the core member 25. The magnetic field of the permanent magnet 34 acts on the metallic piece 35. The metallic piece 35 is thus drawn to the permanent magnet 34. When the actuator arm 21 swings furthest in a normal direction, the metallic piece 35 is received on the permanent magnet 34. The load tab 27 is in this manner held at an inoperative position on the ramp member 28.

A restriction mechanism or latch mechanism 41 is also related to the head actuator 18. The latch mechanism 41 includes a protrusion 42 formed on the core member 25. The protrusion 42 extends along an imaginary circle described around the support shaft 20. The protrusion 42 may be integral to the core member 25 based on molding. The protrusion 42 is allowed to move along a predetermined path on the imaginary circle based on the rotation of the actuator block 19, namely the swinging movement of the core member 25.

The latch mechanism 41 further includes a plate-shaped lever 44 coupled to a vertical first shaft 43 for relative swinging movement. The first shaft 43 stands upright from the bottom plate of the base 13. The first shaft 43 is formed in a columnar shape, for example. The first shaft 43 is supported on the base 13. A weight 45 is coupled to the lever 44. The weight 45 is thus supported on the first shaft 43 for swinging movement. The inertial force of the weight 45 accordingly causes the swinging movement of the lever 44 around the first shaft 43. The lever 44 and the weight 45 may be made of a metallic material such as a stainless steel, for example.

A swinging member 47 is related to the lever 44. The swinging member 47 is supported on a vertical second shaft 46 for swinging movement. The second shaft 46 stands upright from the bottom plate of the base 13. The second shaft 46 is formed in a columnar shape, for example. The second shaft 46 is supported on the base 13. The swinging member 47 is allowed to swing around the second shaft 46 in response to the swinging movement of the lever 44 around the first shaft 43, as described later in detail. The swinging member 47 is in this manner allowed to move into the path of movement of the protrusion 42. The swinging member 47 may be made of a resin material, for example.

Figure 3:
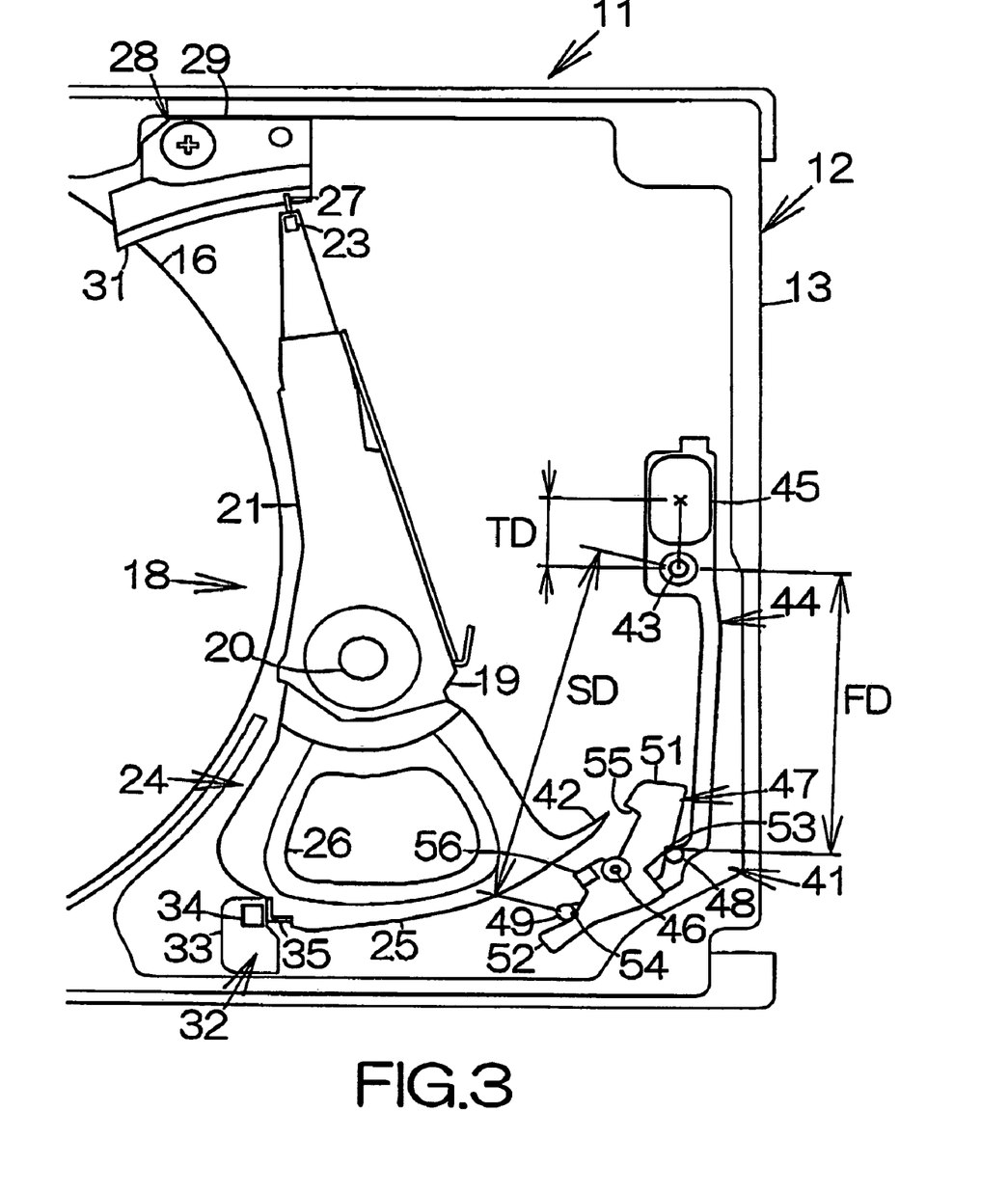
FIG. 3 is an enlarged partial plan view of the hard disk drive for schematically illustrating the structure of a latch mechanism.

As shown in FIG. 3, first and second contact pieces 48, 49 are formed on the lever 44. The first and second contact pieces 48, 49 stand upright from the upper surface of the lever 44. The second contact piece 49 may be located near the tip end of the lever 44, for example. The first contact piece 48 may be located at a position distanced from the second contact piece 49 by a predetermined interval. The first and second contact pieces 48, 49 may be formed in a columnar shape, for example.

The swinging member 47 includes first and second swinging pieces 51, 52 extending in opposite directions from the second shaft 46. The first swinging piece 51 is designed to contact the lever 44 at a first operating spot 53 on the first contact piece 48. The second swinging piece 52 is likewise designed to contact the lever 44 at a second operating spot 54 on the second contact piece 49. The swinging member 47 is located at a position defined between the first and second operating spots 53, 54 within a space between the lever 44 and the cover 14.

Here, the first operating spot 53 is distanced from the first shaft 43 by a first distance FD. The second operating spot 54 is distanced from the first shaft 43 by a second distance SD. The first distance FD is set shorter than the second distance SD. On the other hand, the weight 45 is distanced from the first shaft 43 by a third distance TD shorter than both the first and second distances FD, SD. As a result, the movement of the weight 45 enables a larger displacement of the tip end of the lever 44, namely of the first and second operating spots 53, 54.

A receiving hole 55 is defined in the first swinging piece 51. The receiving hole 55 is designed to receive the insertion of the protrusion 42 when the first swinging piece 51 moves into the path of movement of the protrusion 42. A magnetic or metallic piece 56 is fixed on the second swinging piece 52. The metallic piece 56 is drawn to the voice coil motor 24 based on the magnetic field acting from the permanent magnet of the voice coil motor 24. The metallic piece 56 serves to hold the first swinging piece 51, namely the swinging member 47, at a position retreating from the path of movement of the protrusion 42.

Now, assume that the magnetic recording disk 16 stops rotating. When the read or write operation has been completed, the voice coil motor 24 drives the actuator arms 21 in the normal direction around the support shaft 20. The actuator arms 21 and the head suspensions 22 are moved outward in the radial direction of the magnetic recording disk 16. When the flying head slider 23 moves beyond the outermost recording track so as to reach the landing zone or non-data zone, the load tab 27 is contacted with the ramp body 31. A further swinging movement of the actuator arm 21 allows the load tab 27 to climb up the slope defined on the ramp body 31. The load tab 27 is in this manner distanced from the surface of the magnetic recording disk 16.

When the actuator arm 21 further swings, the load tab 27 slides on the ramp body 31. The load tab 27 finally reaches the position remotest outward from the magnetic recording disk 16. The load tab 27 is thus positioned at the inoperative position. The metallic piece 35 on the core member 25 is received on the permanent magnet 34. The magnetic recording disk 16 then stops rotating. Since the load tab 27 is held on the ramp member 28, the flying head slider 23 is prevented from touching or colliding against the magnetic recording disk 16 even though the flying head slider 23 fails to receive airflow. Adsorption is efficiently prevented between the flying head slider 23 and the lubricating agent spreading over the surface of the magnetic recording disk 16.

When the hard disk drive 11 receives instructions to write or read information, the magnetic recording disk 16 first starts rotating. When the magnetic recording disk 16 enters the steady state, the voice coil motor 24 drives the actuator arms 21 in the reverse direction opposite to the normal direction around the support shaft 20. The actuator arms 21 and the head suspensions 22 are moved toward the rotation axis of the magnetic recording disk 16. The load tab 27 slides on the corresponding ramp body 31. The swinging movement of the actuator arms 21 causes the load tab 27 to move downward along the slope on the corresponding ramp body 31.

The flying head slider 23 gets opposed to the surface of the magnetic recording disk 16 during the downward movement of the load tab 27. Airflow generated along the surface of the rotating magnetic recording disk 16 serves to generate a lift on the flying head slider 23. A further swinging movement of the actuator arms 21 causes the load tab 27 to get released from the ramp member 28. Since the magnetic recording disk 16 rotates in the steady state, the flying head slider 23 keeps distanced from the surface of the magnetic recording disk 16 without any support of the ramp member 28. The actuator arm 21 in this manner follows the predetermined path of movement.

As shown in FIG. 3, the load tab 27 is held at the inoperative position based on the magnetic field acting from the permanent magnet 34 when the magnetic recording disk 16 stands still. Now, assume that the impact acting on the base 13 induces a driving force to cause the actuator arms 21 to swing. The actuator arms 21 swing around the support shaft 20 based on the inertial force irrespective of the magnetic field acting from the permanent magnet 34. The core member 25 thus swings around the support shaft 20. The load tab 27 slides on the corresponding ramp body 31 toward the surface of the magnetic recording disk 16 from the inoperative position. The inertial force of the weight 45 serves to drive the lever 44 for swinging movement around the first shaft 43 from the initial position.

Figure 4:
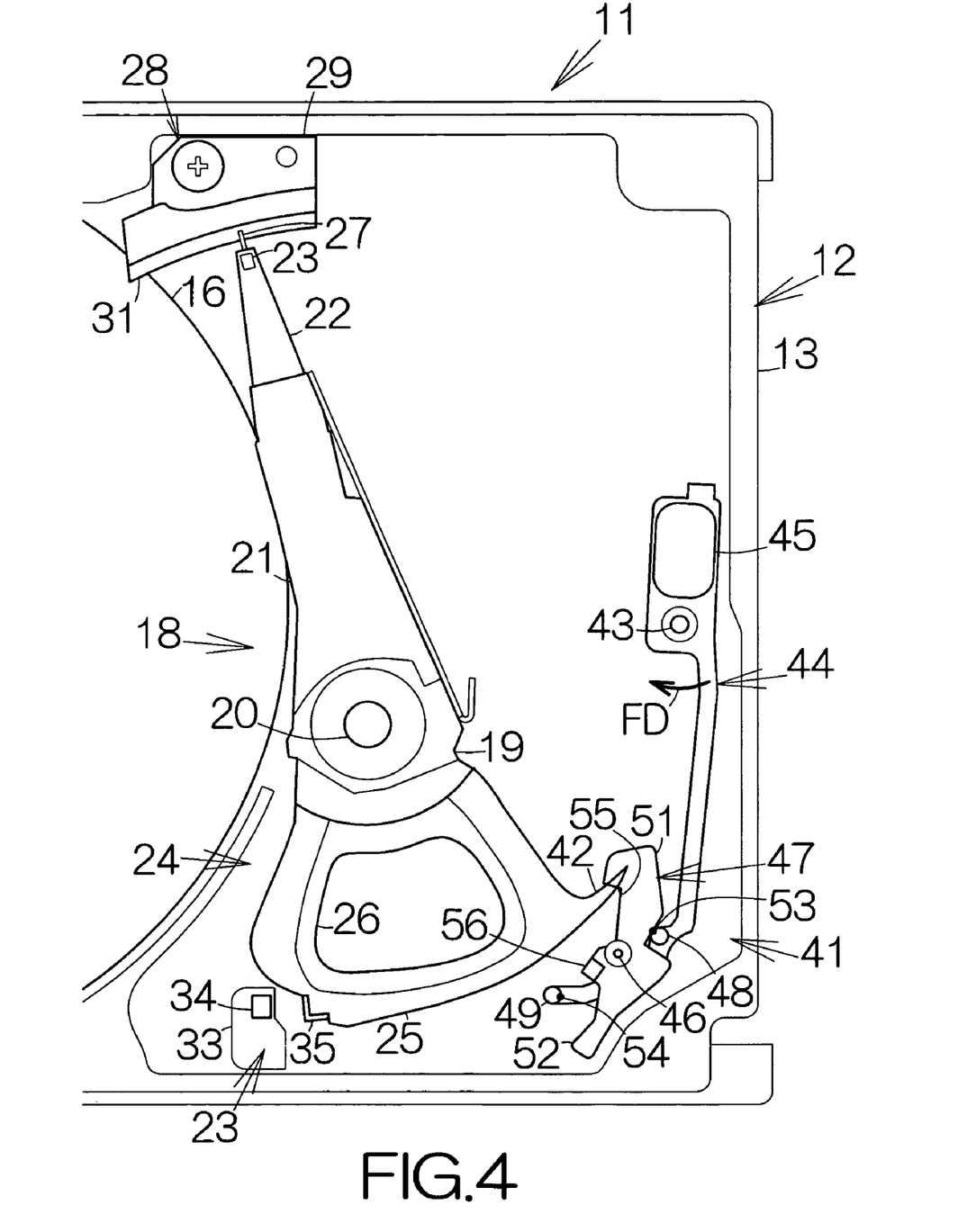
FIG. 4 is an enlarged partial plan view of the hard disk drive for schematically illustrating the latch mechanism when the swinging movement of the actuator arms is restricted.

As shown in FIG. 4, if the lever 44 swings around the first shaft 43 in a first direction FD, for example, the first contact piece 48 of the lever 44 is contacted with the first swinging piece 51 at the first operating spot 53. The contact causes the swinging piece 51 of the swinging member 47 to swing around the second shaft 46. The first swinging piece 51 moves into the path of movement of the protrusion 42 around the second shaft 46. The protrusion 42 of the head actuator 18 is in this manner received in the receiving hole 55 of the first swinging piece 51. The swinging movement of the actuator arms 21 is thus restricted. The load tabs 27 are prevented from moving toward the magnetic recording disk 16. The load tabs 27 are kept on the ramp bodies 31. Contact is prevented between the flying head slider 23 and the surface of the magnetic recording disk 16. The flying head slider 23 is reliably protected from damages.

Figure 5:
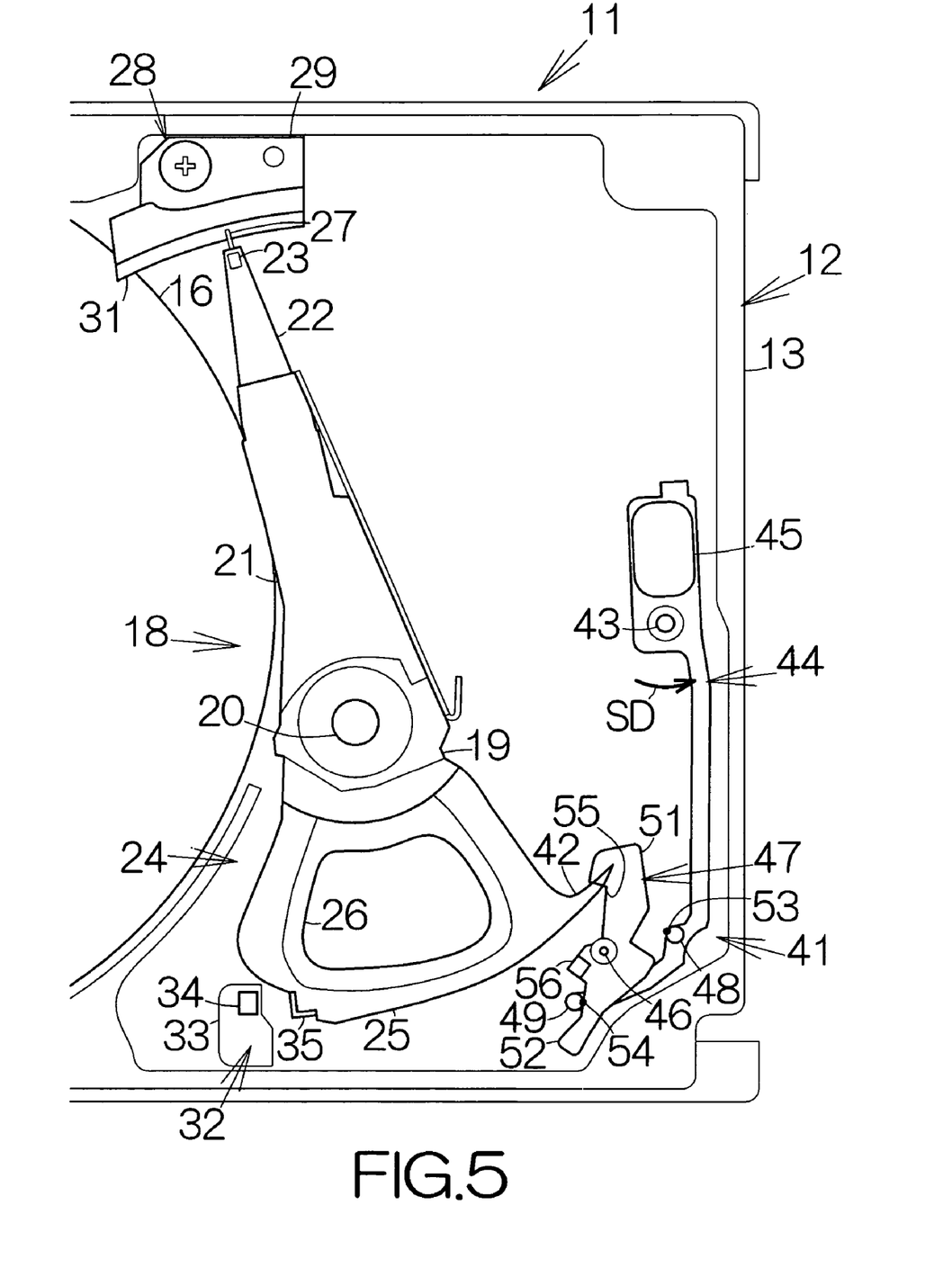
FIG. 5 is an enlarged partial plan view of the hard disk drive for schematically illustrating the latch mechanism when the swinging movement of the actuator arms is restricted.

As shown in FIG. 5, if the lever 44 swings around the first shaft 43 in a second direction SD opposite to the first direction FD, the second contact piece 49 of the lever 44 is contacted with the second swinging piece 52 of the swinging member 47 at the second operating spot 54. The contact causes the swinging movement of the second swinging piece 52 around the second shaft 46. The swinging movement of the second swinging piece 52 allows the first swinging piece 51 to move into the path of movement of the protrusion 42. The protrusion 42 of the head actuator 18 is in this manner received in the receiving hole 55 of the first swinging piece 51. The swinging movement of the actuator arms 21 is thus restricted. The load tabs 27 are prevented from moving toward the magnetic recording disk 16. The load tabs 27 are kept on the ramp bodies 31. Contact is prevented between the flying head slider 23 and the surface of the magnetic recording disk 16. The flying head slider 23 is reliably protected from damages.

The latch mechanism 41 serves to restrict the swinging movement of the actuator arms 21 around the support shaft 20 in the hard disk drive 11, even if impact acts on the hard disk drive 11 around the support shaft 20 of the head actuator 18 during the still state of the magnetic recording disk 16. The movement of the load tab 27 is restrained on the ramp member 28. Contact is thus reliably prevented between the flying head slider 23 and the surface of the magnetic recording disk 16. The flying head slider 23 is reliably protected from damages.

Moreover, the swinging member 47 is located at a position defined between the first and second operating spots 53, 54 within a space between the lever 44 and the cover 14. Even if impact acts on the hard disk drive 11, the tip end of the lever 44 is received on the back surface of the swinging member 47 between the first and second operating spots 53, 54. The lever 44 is prevented from moving in parallel with the axis of the first shaft 43. The tip end of the lever is likewise prevented from moving in the axial direction of the second shaft 46. Contact is reliably prevented between the lever 44 and the cover 14 while the tip end of the lever 44 is still allowed to move by a larger displacement. Generation of noise can thus be avoided. The head actuator 18 is reliably prevented from suffering from vibration. The electromagnetic transducer on the flying head slider 23 is allowed to read or write information with a higher accuracy as expected.

In addition, the second swinging piece 52 of the swinging member 47 is drawn to the permanent magnet of the voice coil motor 24 based on the attraction acting on the metallic piece 56. Specifically, magnetic field acts on the metallic piece 56 along a horizontal plane perpendicular to the second shaft 46 as well as a vertical plane including the second shaft 46. This serves to prevent the swinging member 47 from moving in the axial direction of the second shaft 46. Since the tip end of the lever 44 is received on the back surface of the swinging member 47 at a location between the first and second operating spots 53, 54 in the aforementioned manner, the tip end of the lever 44 is reliably prevented from moving in parallel with the axis of the first shaft 43.

Figure 6:
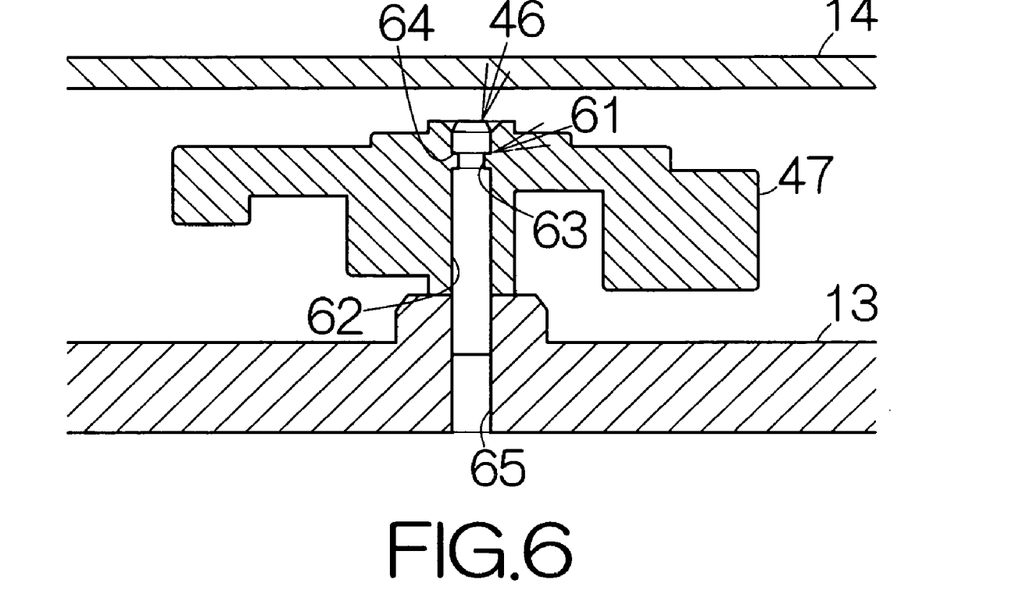
FIG. 6 is an enlarged vertical sectional view of a swinging member in the latch mechanism for schematically illustrating a restriction mechanism according to a first example.

For example, a restriction mechanism 61 may be incorporated in the hard disk drive 11, as shown in FIG. 6. The restriction mechanism 61 includes a protrusion 63 and an elongated groove 64 receiving the protrusion 63. The protrusion 63 is formed to protrude from the inside surface of a shaft bore 62 formed in the swinging member 47 so as to receive the second shaft 46. The elongated groove 64 is formed to extend over the outer cylindrical surface of the second shaft 46 around the longitudinal axis of the second shaft 46. The shaft bore 62 defines a columnar space, for example. The elongated groove 64 may endlessly extend around the second shaft 46. The combination of the protrusion 63 and the elongated groove 64 enables the swinging movement of the swinging member 47 around the second shaft 46. Here, the second shaft 46 may be press-fitted into a through hole 65 defined in the base 13, for example. The protrusion 63 received in the elongated groove 64 in the hard disk drive 11 serves to restrict the movement of the swinging member 47 in the axial direction of the second shaft 46 along the second shaft 46. The tip end of the lever 44 is reliably prevented from displacement.

Figure 7:
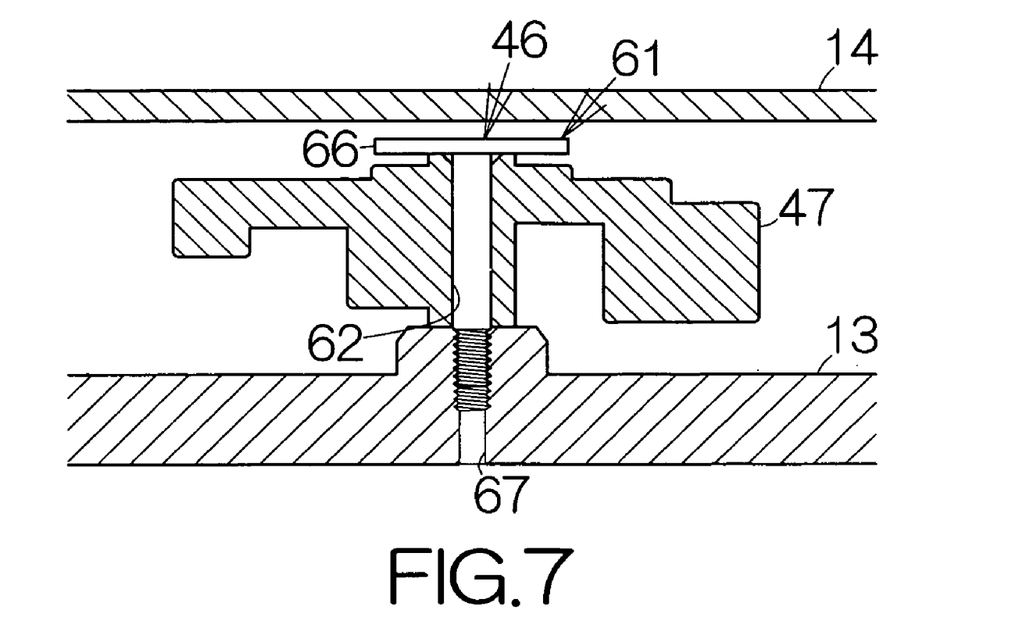
FIG. 7 is an enlarged vertical sectional view of a swinging member in the latch mechanism for schematically illustrating a restriction mechanism according to a second example.

Otherwise, the restriction mechanism 61 may include a protrusion or flange 66 extending outward from the outer cylindrical surface of the second shaft 46, in place of the protrusion 63 and the elongated groove 64, as shown in FIG. 7. The flange 66 is designed to hold the swinging member 47 against the base 13. Here, the flange 66 is opposed to the top surface of the swinging member 47. The flange 66 may be a screw head of the second shaft 46. The second shaft 46 is received in the shaft bore 62 of the swinging member 47. The second shaft 46 is received in the base 13 at the threaded portion. The threaded portion is screwed into a tapped bore 67 defined in the base 13. The flange 66 serves to restrain the movement of the swinging member 47 in the axial direction of the second shaft 46 along the second shaft 46. The tip end of the lever 44 is reliably prevented from displacement.

The recording disk drive may include, in addition to the aforementioned hard disk drive 11, a magneto-optical disk drive utilizing a magneto-optical disk in combination with a magnetic head mounted on a head slider, an optical disk drive utilizing an optical disk in combination with an optical element mounted on a head slider, and the like.

What is claimed is:

1. A disk drive comprising:
   a head actuator member supporting a head slider, said head actuator member following a predetermined path when released from a ramp member based on swinging movement around a support shaft;
   a lever supported on a first shaft for swinging movement, said lever defining first and second operating spots distanced from the first shaft by first and second distances, respectively;
   a weight supported on the first shaft for connection to the lever, said weight distanced from the first shaft by a third distance shorter than the first and second distances; and
   a swinging member supported on a second shaft for swinging movement, said swinging member being located at a position defined between the first and second operating spots within a space between the lever and a cover, wherein
   said swinging member comprises:
   a first swinging piece designed to contact the first operating spot of the lever swinging in a first direction so that the first swinging piece swings around the second shaft into the predetermined path of the head actuator member; and
   a second swinging piece designed to contact the second operating spot of the lever swinging in a second direction opposite to the first direction so that the second swinging piece allows the first swinging piece to swing around the second shaft into the predetermined path of the head actuator member.

2. The disk drive according to claim 1, further comprising:
   a voice coil motor designed to drive the head actuator member for the swinging movement; and
   a magnetic piece located on the second swinging piece, said magnetic piece being drawn to a magnetic field acting from the voice coil motor.

3. The disk drive according to claim 1, further comprising a restriction mechanism designed to restrict movement of the swinging member along an axial direction of the second shaft relative to the second shaft.

4. The disk drive according to claim 1, further comprising:
   a protrusion protruding from an inside surface of a shaft bore formed in the swinging member so as to receive the second shaft; and
   an elongated groove extending on an outer surface of the second shaft around a longitudinal axis of the second shaft, said elongated groove being designed to receive the protrusion.

5. The disk drive according to claim 1, further comprising a protrusion protruding from an outer surface of the second shaft, said protrusion being designed to hold the swinging member against a base member supporting the second shaft.

* * * * *